United States Patent [19]

Richter et al.

[11] 3,850,836

[45] Nov. 26, 1974

[54] AIR ACTIVATED HYDROGEN PEROXIDE OXALATE ESTER-FLUORESCER CHEMILUMINESCENT SYSTEM

[75] Inventors: Herbert P. Richter; Carl A. Heller, both of China Lake; William P. Norris, Ridgecrest; William S. McEwan, China Lake, all of Calif.

[73] Assignee: The United States of America as represented by the Secretary of the Navy, Washington, D.C.

[22] Filed: Nov. 6, 1972

[21] Appl. No.: 304,189

[52] U.S. Cl.............. 252/188.3 CL, 252/301.2 R, 252/301.3 R
[51] Int. Cl............................................. C09k 3/00
[58] Field of Search........... 252/188.3 CL, 301.2 R, 252/301.3 R

[56] References Cited
UNITED STATES PATENTS

| | | | |
|---|---|---|---|
| 3,511,612 | 5/1970 | Kennerly et al. | 252/188.3 CL |
| 3,557,233 | 1/1971 | Zweig et al. | 252/188.3 CL |
| 3,576,987 | 5/1971 | Voight et al. | 252/188.3 CL |
| 3,630,941 | 12/1971 | Bergmark | 252/188.3 CL |

Primary Examiner—Stephen J. Lechert, Jr.
Attorney, Agent, or Firm—R. S. Sciascia; Roy Miller; Lloyd E. K. Pohl

[57] ABSTRACT

A method for providing a hydrogen peroxide reactive chemiluminescent system which operates efficiently as one unit. The method avoids the necessity for separately storing two reactive components. It comprises adding under oxygen free conditions an organic compound selected from the group consisting of anthrahydroquinone, 2-ethylanthrahydroquinone, 2-tertiarybutylanthrahydroquinone, and benzoin to a solution of an oxalate ester, a fluorescer, and a catalyst, if one is required. Upon exposure of this solution to oxygen, light is emitted by a chemiluminescent reaction.

4 Claims, No Drawings

AIR ACTIVATED HYDROGEN PEROXIDE OXALATE ESTER-FLUORESCER CHEMILUMINESCENT SYSTEM

BACKGROUND OF THE INVENTION

1. Field of the Invention

This invention relates to the direct generation of light from chemical energy, i.e. chemiluminescence.

2. Description of the Prior Art

Generation of light from chemical energy at ambient temperature is well known. However, practicioners in the art are continually searching for improved compositions and new methods for use in signal devices, area illumination, etc. Two types of efficient chemiluminescent systems are known; an atmospheric oxygen reactive type and a binary system in which hydrogen peroxide is one of the reactants. One of the most popular oxygen reactive systems is the peraminoethylene, tetrakis (dimethylamino)ethylene system. Formulations containing peraminoethylenes are stored in the absence of air and luminesce when exposed to oxygen. One of the most efficient binary chemiluminescent systems is the binary liquid type in which one component is a dilute solution of hydrogen peroxide and the other component is a solution of an oxalate ester and a fluorescer. This system requires that the two solutions be stored separately and mixed thoroughly when light is required. The liquid hydrogen peroxide solution is hazardous to prepare due to its strong oxidizing and potentially explosive characteristics. It is also difficult to store over a period of time due to its rapid decomposition if trace quantities of contaminants are present. These problems necessitate very exact handling techniques as well as the selection of very specific and costly containment or packaging materials. The requirement that the components be mixed thoroughly prior to use has been a serious drawback in the development of signaling and marking devices. The method of the present invention solves these problems in that hydrogen peroxide can be utilized without the separate storage and mixing of two reactive components.

BRIEF DESCRIPTION OF THE INVENTION

In accordance with the instant invention an organic compound selected from the group consisting of anthrahydroquinone, 2-ethyl-anthrahydroquinone, 2-tertiarybutylanthrahydroquinone and benzoin are added under oxygen free conditions to a solution consisting of an oxalate ester such as bis (2,4,5-trichloro-6-carbobutoxyphenyl) oxalate and a fluorescer, such as 9, 10-bis (phenylethynyl)anthracene in the solvent, dibutylphthalate. Upon exposing this mixture to air, luminescence is observed which reaches a peak intensity after 10 to 120 minutes. Light continues to be emitted for from about 30 minutes to about 24 hours. The addition of a few milligrams of sodium salicylate or tetrabutylammonium salicylate increases the intensity and shortens the delay to peak intensity.

DESCRIPTION OF THE PREFERRED EMBODIMENTS

The following examples are intended to illustrate the invention and are in no way intended to limit the invention except as limited in the appended claims.

EXAMPLE I

A formulation comprising 0.04M of anthrahydroquinone 0.05M of bis(2,4,5-trichloro-6-carbobutoxyphenyl) oxalate and $1.5 \times 10^{-3}$M of 9, 10-bis(phenylethynyl) anthracene fluorescer in dibutylphthalate solvent was prepared in the absence of oxygen at room temperature. A glove box containing a nitrogen atmosphere was used in the preparation.

Upon exposure of a sample of this formulation to air, luminescence was observed which reached peak intensity after 30 to 120 minutes.

The addition of a few milligrams of sodium salicylate increased the intensity and shortened the delay to peak intensity.

The compound anthrahydroquinone used above was prepared by the reduction of anthraquinone by hydrogen in the presence of a platinum catalyst in an ethanol solvent. Upon filtering and evaporation of the ethanol in an oxygen-free atmosphere, anthrahydroquinone, was recovered in 88 percent yield.

EXAMPLE II

A formulation comprising 0.05M of 2-ethylanthrahydroquinone 0.05M of bis (2,4,5-trichloro-6-carbobutoxyphenyl) oxalate, $1.5 \times 10^{-3}$M of 9, 10-bis(phenylethynyl)anthracene fluorescer in dibutylphthalate solvent was prepared in the absence of oxygen.

Upon exposure of several samples to air, bright luminescence was observed. The intensity reached a peak brightness in about 2 minutes and diminished slowly. A low intensity emission was then observed over 24 hours.

The compound, 2-ethylanthrahydroquinone, was prepared by reduction of 2-ethylanthraquinone with hydrogen and a platinum catalyst in dibutylphthalate solvent. The platinum cataylst was then removed by filtration.

EXAMPLE III

A formulation comprising 0.05M of benzoin (2-hydroxy-2-phenylacetophenone), 0.05M of bis(2,4,5-trichloro-6-carbobutoxyphenyl) oxalate and $1.5 \times 10^{-3}$M of 9,10-bis(phenylethynyl)anthracene in dibutylphthalate solvent was prepared in the absence of oxygen at ambient temperature.

Upon exposing samples of this formulation to air, a low intensity light emission was observed for about 30 minutes.

The primary advantages of this invention are that a hydrogen peroxide reactive chemiluminescent system can be utilized without the separately storing and mixing two reactant components. The hydrogen peroxide required for chemiluminescence is produced when formulations of the instant invention are exposed to atmospheric oxygen. The problems inherent in the preparation and storage of hydrogen peroxide solution are thereby eliminated. Hardware previously developed to use the peraminoethylene chemiluminescent formulations can be used with this system. The potential light capacity of the air reactive oxalate ester-hydrogen peroxide system should equal or exceed the binary liquid system.

The oxalate ester, bis (2,4,5-tri-chloro-6-carbobutoxyphenyl) oxalate, and the fluorescer, 9, 10-bis(phenylethynyl)anthracene were used in the examples disclosed herein. Other oxalate esters such as bis(-2,4,5-trichloro-6-carbopentoxyphenyl) oxalate and other fluorescers such as rubrene can be used if they prove to be compatible with the anthrahydroquinone and benzoin compounds.

What is claimed is:

1. A method for generating light from chemical energy which comprises:
   a. preparing a light-producing formulation by adding under oxygen-free conditions at ambient temperature an organic compound selected from the group consisting of anthrahydroquinone, 2-ethylanthrahydroquinone, 2-tertiarybutylanthrahydroquinone and 2-hydroxy-2-phenylacetophenone to an oxalate ester - fluorescer component which will react with hydrogen peroxide to give light; and
   b. exposing said formulation to air whereby light is emitted having a life of from 30 minutes to 24 hours.

2. The method in accordance with claim 1 wherein additionally a trace quantity of sodium salicylate or tetrabutylammonium salicylate is added.

3. A light generating formulation comprising:
   a. an organic compound selected from the group consisting of anthrahydroquinone, 2-ethylanthrahydroquinone, 2-tertiarybutylanthrahydroquinone and 2-hydroxy-2-phenylacetophenone; and
   b. an oxalate ester - fluorescer component which will react with hydrogen peroxide to produce light.

4. The formulation in accordance with claim 3 wherein the oxalate ester is selected from the group consisting of bis(2,4,5-trichloro-6-carbobutoxyphenyl) oxalate and bis(2,4,5-trichloro-6-carbopentoxyphenyl) oxalate and wherein the fluorescer is selected from the group consisting of 9, 10-bis (phenylethynyl)anthracene and rubrene.

* * * * *